Sept. 25, 1962

H. D. CRANE 3,056,116

LOGICAL SEQUENCE DETECTION SYSTEM

Filed Aug. 18, 1958

INVENTOR.
HEWITT D. CRANE
BY
Lyon+Lyon
ATTORNEYS

United States Patent Office 3,056,116
Patented Sept. 25, 1962

3,056,116
LOGICAL SEQUENCE DETECTION SYSTEM
Hewitt D. Crane, Palo Alto, Calif., assignor to AMP Incorporated, Harrisburg, Pa., a corporation of New Jersey
Filed Aug. 18, 1958, Ser. No. 755,742
19 Claims. (Cl. 340—174)

This invention relates to systems of logic using electrical circuits and, more particularly, to improvements therein.

The function of detecting the occurrence of a proper sequence may be performed in many different ways. A combination lock, for example, will only open if the proper sequence of combination numbers has been followed. The operation of reading entails the recognition of sequences of letters. In electronic information-handling machines, in many instances, the programming operations require the recognition of code words.

An object of the present invention is to provide a novel electrical sequence detector.

Another object of the present invention is the provision of a useful sequence detector.

Yet another object of the present invention is the provision of a novel and simple sequence detector.

These and other objects of this invention are achieved in an arrangement which includes a unique type of shift register. The number of stages in this shift register is determined by the number of units in the sequence to be detected. The word "unit" is intended to mean either a letter or number or occurrence, a plurality of which comprise the sequence to be detected. By way of example, if it is desired to detect the word "save" or the number sequence 2, 5, 7, 9, then the register will have one stage associated with each unit in order to detect one of these sequences.

The stages of the register are in sequence. A stage which occupies a position in the register sequence corresponding to the position of a unit in the sequence which is sought to be detected may be said to be associated with that unit, and vice versa. Since the units are represented by signals, then it may be stated that each of the plurality of the stages of the register, whether an electronic circuit or magnetic core, is associated with a different one of the signals, and the stages of the register are in the same order as the order of the signals which are sought to be detected.

Upon the occurrence of the first unit in a sequence, the first stage of the register will indicate a "one" condition. As each unit of the desired sequence occurs, this one is successively passed from stage to stage until the last stage, where it indicates the occurrence of a successful sequence. In the event during the occurrence of a sequence, a unit not in the sequence occurs, then the register is reset, or cleared, to its initial state, and it looks for the sequence again. For example, if the register is looking for the sequence "save" and it finds the letters "saf," then, upon the occurrence of the "f," the register will be cleared and will look for "save" again.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

In order to clearly explain this invention and its capabilities, by way of illustration, there are employed words which represent the sequences to be detected. This is not to be considered as a limitation upon the utility of the invention, since those skilled in the art will readily see that it is adaptable to be employed to detect any desired sequence of inputs, no matter what is represented by these inputs.

Consider, first, that it is desired to detect a sequence, no matter when or how it appears in a message, i.e., independent of the message structure. For example, it is desired to detect the sequence "atom" whenever it occurs in a message, for example, "atom-atoms-atomic-sub-atomic-anatomy." In this case, for "bulk" classifying, a single detector catches all related words, independent of prefix or suffix. Of course, this requires that one is satisfied with accepting words which may not be closely related to the desired word—as anatomy, in the case above.

Figures 1, 2:
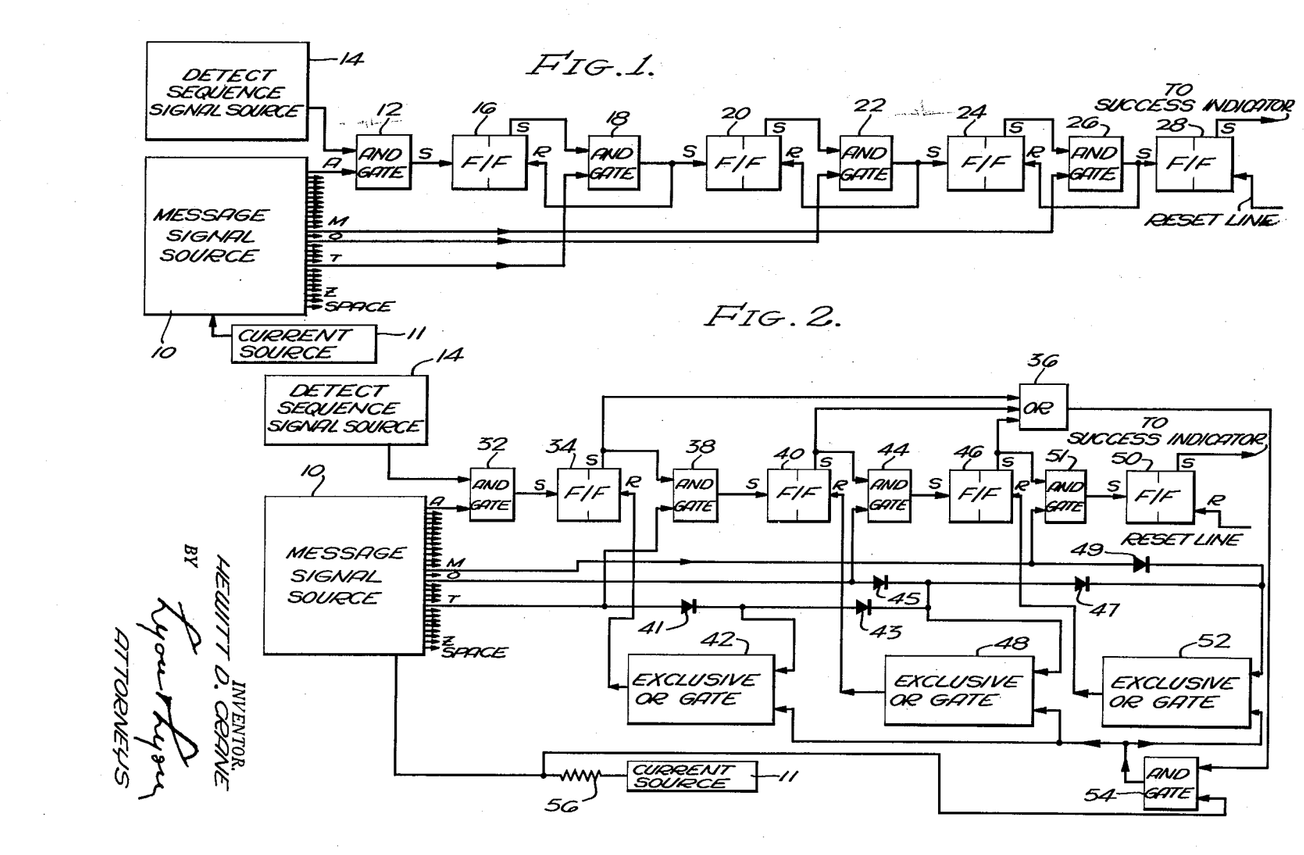
FIGURE 1 is a block diagram of a simple sequence detector shown for simplifying this explanation.
FIGURE 2 is a block diagram of an embodiment of this invention.

Referring to FIGURE 1, there is seen by way of illustration an arrangement suitable for the bulk classification mentioned. A message-signal source 10 will energize any one of the four leads, respectively designated as $a$, $t$, $o$, $m$, whenever these letter occur in the message. The message-signal source 10 may represent a typewriter having the $a$, $t$, $o$, $m$ keys connected through a source of potential, or a decoding matrix to which signals are applied from code-signal sources, such as magnetic tape, punched tape, and the like, or other signal-storage media.

The $a$-line is connected to an AND gate 12, which has as its other input the output of a rectangle 14, which is labeled the "detect" sequence signal source. This rectangle is shown by way of illustration of either a key or pushbutton, or signal from a computer which instructs the circuit to look for the desired sequence. Accordingly, when an "$a$" energizes the line "$a$" and the detect-sequence signal source is energized, the AND gate 12 applies a signal to the flip-flop circuit 16, to cause it to be driven from its reset to its set condition.

When in its set condition, flip-flop 16 applies one enabling input to an AND gate 18. However, AND gate 18 will not respond until the $t$-line provides an input, whereupon the output of AND gate 18 is employed to set a flip-flop 20 and to reset flip-flop 16 to its initial state. The set output of flip-flop 20 is applied to an AND gate 22, which will not respond thereto until it receives the second required input from the $o$-line, which is connected to the message-signal source 10. Thereupon, AND gate 22 applies an output to set flip-flop 24 and to reset flip-flop 20. The output of flip-flop 24, when in its set condition, is applied to an AND gate 26. When the $m$-line, which is connected to the AND gate 26, receives a signal from the message-signal source 10, then an output from AND gate 26 will set a flip-flop circuit 28 and will reset flip-flop 24.

When flip-flop 28 is set, it is an indication that the desired sequence has been found and a success indicator of any desired type may be actuated. Flip-flop 28 may then be reset so that the entire circuit may then look for the sequence again. Assuming it is desired to detect only the exact word "atom," with no variations, then the circuit just described cannot be used, since it will indicate success every time the sequence $a, t, o, m$ occurs, no matter what the prefix or suffix, and, indeed, if allowed to look at messages containing several words, the register will indicate a successful sequence if the letters $a, t, o, m$ occur in that sequence over the several words.

Reference is now made to FIGURE 2, which shows a block diagram representing a circuit arrangement in accordance with this invention for detecting only the desired sequence and no variations. The message-signal source 10, as before, exemplifies any arrangement, such as a typewriter or decoding matrix which can energize a particular one of a plurality of output lines representing a unit in a message. A current source 11 each time, for example, the key of a typewriter is depressed, will provide current for energizing the output line to which the current source is connected by that key.

The detect-sequence signal source 14 is energized, its output is applied to an AND gate 32, to which there is also connected the $a$-line output from the message-signal source 10. The output of AND gate 32, which is provided upon coincidence of the two inputs, is applied to set a flip-flop circuit 34. The set output of the flip-flop circuit 34 is applied to an OR gate 36, as well as to a succeeding AND gate 38. The second required input to the AND gate 38 is received from the $t$-line connected to the message-signal source. The output of AND gate 38, upon the coincidence of its two inputs, is applied to set a flip-flop circuit 40. The $t$-line signal is applied through a rectifier 41 to an exclusive-OR circuit 42 and through another rectifier 43 to another exclusive-OR circuit 48. As will be explained below, this prevents flip-flops 34 and 40 from being reset and thus losing the fact of the detection of $a$ and $t$. The set output of flip-flop 40 is applied to the OR gate 36 and also to the AND gate 44. Upon the occurrence of the energization of the $o$-line, AND gate 44 can apply an output to set flip-flop 46. The $o$-line signal is also applied through rectifiers 45 and 47 respectively to exclusive-OR gates 48 and 52 to prevent flip-flops 40 and 46 from being reset. Rectifier 43 blocks the $o$-line signal from exclusive-OR gate 42. Rectifier 49 blocks it from AND gate 48. The set output of flip-flop 46 is applied to AND gate 51 and to the OR gate 36. Upon the occurrence of the energization of the $m$-line, AND gate 51 is enabled to apply an output to set flip-flop 50, indicative of a successful sequence being detected. The $m$-line signal is also applied through a rectifier 49 to the exclusive-OR circuit 52, to prevent flip-flop 46 from being reset. Rectifier 47 blocks the $m$-line signal from affecting the preceding circuits.

It will be noted that OR gate 36 applies its output to an AND gate 54. Whenever any one of the flip-flops 34, 40, 46 is in its set condition, OR gate 36 can energize one of the inputs of AND gate 54. The other required input for deriving an output from AND gate 54 is obtained from a resistor 56, which is in series with the current source. Each time any one of the output lines from "$a$" through "$z$" is connected to the current source, the ensuing voltage drop across resistor 56 is employed as a second required energizing signal for AND gate 54. The output of AND gate 54 is applied to the three exclusive-OR circuits 42, 48, and 52. As is well known, these circuits will only provide an output when either of of their inputs are energized. When both of their inputs are energized, then no output is obtained.

Assume that by way of illustration, $a, t,$ and $o$ have occurred in the proper sequence and therefore flip-flops 40 and 46 are in their set conditions and flip-flops 34 and 50 are in their reset conditions. Should any other letter occur following the $o$ but the $m$, then AND gate 54 is energized and applies its output to all the exclusive-OR circuits. Since the required blocking inputs to the exclusive-OR gates 48 and 52 are not being provided, then the output of AND gate 54 can reset flip-flops 40 and 46 and the register is cleared. It can then start looking for the correct sequence again.

It will be appreciated that each time signals from the message-signal source deviate from the correct sequence, the register is cleared. Therefore, only the sequence for which the register is instructed to provide a success signal is able to provide a success signal. Should any one of the letters in the sequence which is being sought occur out of time, then this, too, will clear the register, since the AND gates 38, 44, and 48 will not provide any output for blocking the operation of the exclusive-OR circuits associated with them unless the preceding flip-flop is in its set condition. If a sequence contains more than one of the same kind of units, for example, the word "alarm," then the $a$-line may be wired to all the AND gates which should be energized when the letter "$a$" appears. A repetition, or "bounce," of a letter in a sequence does not affect the register. Thus, it is "bounce" insensitive, for example, to relay or key chatter.

A precaution must be taken when two of the same units are adjacent one another as, for example, in the word "missile." A number of alternatives may be employed. One of these is to provide a "repeat" marker pulse with circuitry for sensing this pulse separating the circuitry used for duplicating each of the identical letters. Another and preferred method is to require that, each time that identical letters or numbers are in sequence, a "repeat" key may be pressed or repeat signal used to provide a repeat pulse in place of the second letter or number in the sequence. The "repeat" sensing circuitry is then used in place of a second letter circuitry. If the repetition occurs more than twice, then the repeated letter or number is alternated with the repeat signal. Thus, 7444332 will be set up and sensed as 7–4–repeat–4–3–repeat–2. This latter arrangement requires no extra circuits and wastes no time in detection.

The storage and gating functions which are carried out by the flip-flops and gates shown in the drawings thus far can be much more simply and inexpensively obtained when magnetic cores and the associated wiring is employed for the purposes. However, before proceeding to an explanation of a preferred embodiment of this invention, a brief explanation will be presented of the operation of a register employing multihole ferrite cores whereby the embodiment of the invention will be readily understood.

Figures 3, 4, 5, 6:
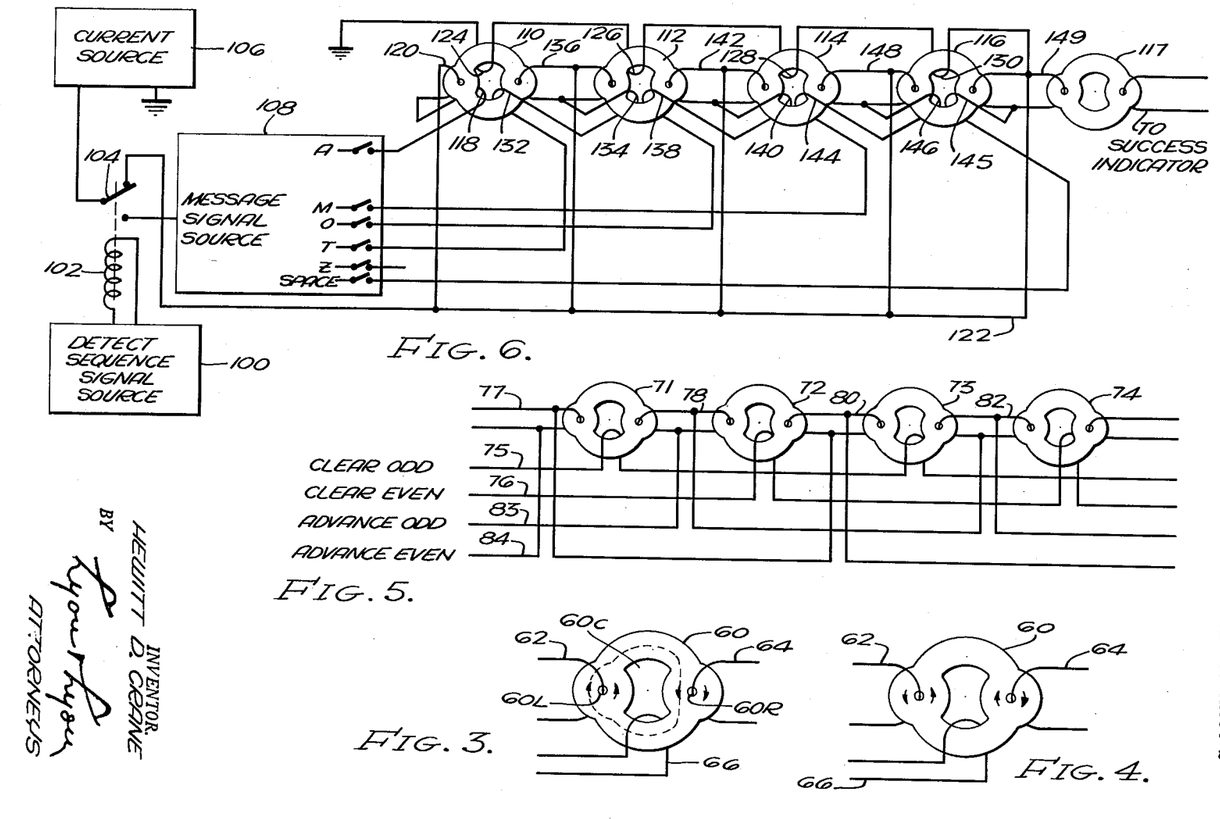
FIGURES 3 and 4 represent multiaperture ferrite cores shown to assist in explaining the operation of the embodiment of the invention.
FIGURE 5 illustrates a magnetic-shift register, shown to assist in an understanding of this invention.
FIGURE 6 is a diagram of a preferred embodiment of the invention.

FIGURE 3 represents a substantially square hysteresis-loop ferrite core 60, having three apertures, a central large aperture 60C, an aperture 60L in the left leg of the core, and an aperture 60R in the right leg of the core. The core material adjacent the apertures 60L and 60R is shaped so that the amount of material on both sides of these apertures is substantially equal to the amount of material in other core portions. This condition is not necessary, but is preferred, since much more effective operation is achieved thereby.

The orientation of the flux lines in the magnetic cores will be represented by arrows, such as the ones shown in FIGURE 3. When the flux lines have the orientation represented by the arrows in FIGURE 3, the core is said to be in the "clear" state, which indicates that the core is storing a binary 0. A winding 62 passes through the aperture 60L and is employed for the purpose of setting the core into a 1-state, as will be subsequently described. A winding 64, which passes through the aperture 60R, is employed for the purpose of reading whether the core is in the clear or one state. A winding 66 is employed for the purpose of resetting the core to its clear state after readout. Upon the application of current to winding 62, which exceeds a predetermined threshold value, then the flux lines will assume the orientation shown in FIGURE 4, which is that for the one or set state. The current applied to the coil 62 will affect the flux line in the shortest path around the core, which is represented by the dotted lines shown in FIGURE 3.

When a core is in the clear state represented in FIGURE 3, the application of a current to the coil 64, which is less than the threshold value of the current required for placing the core in the set state, will have substantially no effect on the condition of the flux lines in the core. However, once the core is in its set state, the application of a current to the coil 64, even though less than the value of the current initially required for setting the core, can change the orientation of the flux lines around the aperture 60R. This induces a voltage back into the winding 64. In order to restore the core 60 to the condition shown in FIGURE 3, it is necessary to apply a current having a sufficiently large amplitude to the clear winding 66.

FIGURE 5 represents a shift register, the operation of which will assist in understanding the operation of the preferred embodiment of the invention. It will be seen that the shift register exemplified by four toroidal cores 71, 72, 73, and 74, having multiapertures and associated windings, each one of which duplicates the core 60, shown in FIGURE 3, and its associated windings. Cores 71 and 73 will be designated as odd cores; cores 72 and 74 will be designated as even cores. A clear-odd-cores winding 75 and a clear-even-cores winding 76 duplicates, for the respective cores, the operation of the clear winding 66 in FIGURE 3. A winding 78 couples the respective right and left apertures of cores 71 and 72; a winding 80 couples the respective right and left apertures of cores 72 and 73; a winding 82 couples the respective right and left apertures of cores 73 and 74. The input winding to core 71 is designated by reference numeral 77. Excitation for advancing any information stored in the odd cores 71, 73 is obtained by applying a current to the line 83, which is connected to coils 78 and 82. Similarly, for advancing the information stored in the even-numbered cores, excitation is applied to the line 84, which is coupled to the coils 77 and 80.

In connection with the description of FIGURES 3 and 4, it was stated that in order to set a core by applying current to its left aperture, it was necessary to exceed a certain threshold current value when that core was in the clear state. If the current does not exceed this threshold value, then the core is left substantially unaffected. This is one of the properties of the ferrite materials having a substantially rectangular hysteresis loop. Readout from the right aperture, when the core is in its set condition, induces a voltage which causes a current to flow in the readout coil, which is added to the readout current. No current in addition to the readout current is induced in the readout coil when the core is in its clear condition. Accordingly, in order to have one core drive another core in the arrangement which is shown in FIGURE 5, then by applying a readout current which is just below the critical level required for setting a core, if a preceding core is in its clear condition, the succeeding core will not be affected. However, if a preceding core is in a set condition, then the readout current, plus the current resulting from the flux change caused by the readout current, is sufficient to set a succeeding core.

Thus, assuming core 71 had a one, or a set, condition and core 72 had a zero, or clear, condition, the operation of the shift register in FIGURE 5 is as follows: First, the advance-odd line 83 is excited, with the readout current which is just below that required to drive a core to the set condition. Core 71, which is in a set condition, in response can have a flux change occur about the right aperture, whereby a voltage is induced in coupling coil 78 which causes the flow of sufficient current in half of the coupling coil 78, coupled to core 72 to drive core 72 to the set condition. Core 73, which is in a zero condition, does not provide additional current in the coupling coil 82, and therefore core 74 remains clear. After the advance-odd line is excited, the clear-odd line is excited to place all the odd cores 71, 73 in their clear condition. The information in the shift register is now stored in the even cores. The advance-even line 84 is excited next, which results in current being applied to the coils 80 and 77. Core 72, which is now in a set condition, induces a voltage in response to which sufficient additional current flows in the current-coupling coil 80 to enable core 73 to be driven to its set condition. Thereafter, the clear-even line 76 is excited to reset cores 72 and 74 to their clear condition. The information in these even cores has been transferred to the succeeding odd cores.

Reference is now made to FIGURE 6, which shows an embodiment of the invention employing multiapertured magnetic-ferrite cores. When it is desired to detect a sequence, which here again is exemplified as the word "atom," then the detect-signal source 100 is energized, whereby a relay 102 closes its contacts 104, enabling a current source 106 to apply current to a message-signal source 108. The message-signal source rectangle 108 exemplifies those previously described, as does the current source and the detect-sequence signal source. A relay is shown for enabling the message-sequence detector. Of course, it is also possible to employ an AND gate, or even another core, which is set and from which the set condition is transferred to the remaining cores in the embodiment of the invention.

Five multiapertured magnetic-ferrite cores 110, 112, 114, 116, and 117 are employed for detecting a sequence and storing an indication of success when the sequence a, t, o, m, and only that sequence, is detected. Energization of the a-line first applies a current to a bucking winding 118, which is coupled to core 110, then to an input winding 120, which is coupled to the left aperture in core 110, and then to a clear line 122, which is connected to the clear windings 124, 126, 128, 130, and then back to the current source. These clear windings are respectively coupled to each one of the cores 110, 112, 114, and 116 to apply a magnetomotive force in a direction to establish these cores in their clear condition. The winding 118, however, bucks out the effects of the winding 124 in the core 110, whereby it is enabled to be transferred to its set condition by the current applied to winding 120. It should be noted that the current applied to the first core in the sequence for driving it to its set condition should exceed the critical value mentioned in the foregoing description. The current, which subsequently is applied to the other lines (t, o, m, and space) in sequence, must not exceed the critical value, but should be just below it.

Should the next line to be excited be the t-line, then this line is connected to a bucking winding 132, and then to another bucking winding 134, which is coupled to the core 112, and then to the coupling or driving winding 136. This driving winding couples the cores 110 and 112 through their respective left and right apertures. The current then splits between the cores 110 and 112 by reason of the connection to the winding 136 and thereafter by means of line 122 is applied to the clear windings 130, 128, 126, and 124.

Bucking windings 132 and 134 are provided with a sufficient number of turns so that when the t-line is excited, bucking windings 132 and 134 can respectively counteract the effects of clear windings 124 and 126. Therefore, cores 110 and 112 will not be cleared, despite the presence of an exciting current on the clear winding. The cores, however, are affected by the current in the coupling coil, which, in view of the set condition of core 110, can transfer that set condition to core 112. It will be appreciated that should any of the other output lines of the message-signal source 108 be excited which are not in the required sequence, then line 122, which is connected to these other output lines, will permit the flow of current through the clear windings on all the cores. In the absence of any opposing current on the bucking windings, then the core which is in the set condition, if any, is cleared, and the search for the proper sequence must commence anew.

Assume now that after the *t*-line is excited, the *o*-line is excited. Current on the *o*-line will flow into a bucking winding 138, which is coupled to core 112, another bucking winding 140, which is coupled to core 114, and to the coupling coil 142, which couples the respective left and right apertures of cores 112 and 114. Thereafter, the current flows down into the line 122 and through all the clear windings on the respective cores. This time, core 110 will be completely cleared. Core 112, however, is not affected by the clear current, in view of the current in the bucking winding 138, and core 114 is not affected by the clear current on its clear winding, in view of the current in the bucking winding 140. The set condition of core 112 is transferred to core 114 by the current in the coupling winding 142.

Should the "*m*" appear next in the sequence, then the *m*-line current flows through a bucking winding 144 coupled to core 114, through a second bucking winding 146 coupled to core 116, through a coupling winding 148, which couples the respective left and right apertures of cores 114 and 116. Again, the presence of current on the clear windings 128 and 130 is opposed by the presence of current on the bucking windings 144 and 146, thereby enabling the transfer of the set condition from core 114 to core 116 by the excited coupling winding. When core 116 is set, this is indicative of a successful sequence having been detected. The condition of the core can be read and applied to a success indicator when desired, if the search operation stops here.

However, it is preferable to store the indication of success in another core 117, since it is not known whether more letters are to follow, as in "atomic"; also, the commencement of another word may clear the squence detector and thus lose the fact of the successful detection. The space symbol, which is employed to separate words (corresponding to the spacebar on the typewriter), excites the space line. Current flows through the space line through bucking winding 145 and then through the coupling winding 149, which couples the left and right apertures of cores 116 and 117. It will be seen that core 117 will be set when a successful sequence has been detected. Readout can be made from core 117 when desired, since once set it will not be affected by other signals from the signal source. It should be cleared after readout.

From the description above, it should be appreciated how the cores and their windings simply replace the storage and gating circuits of the embodiment of the invention shown in FIGURE 2. Since information cannot be simultaneously entered into and read out of the core, the same condition is presented for repetitive units here, as was discussed in connection with FIGURE 2. It is necessary to have a repeat signal and a core which responds thereto in the same manner as to any other unit of a sequence. However, if there are identical units in a sequence and these are not adjacent, then these identical units can all be wired to be excited by connecting their coils in series. Since only one core in the register will be in its set condition, the presence of the reading current in the coupling windings of cores which do not immediately succeed this core have no effect on the conditions of these cores.

A plurality of different words may be looked for simultaneously by connecting the circuits in parallel to the message-signal source.

The embodiments of the invention shown in both FIGURES 2 and 6 will respond to a sequence such as the illustrative "atom," and not to "atomic" or "anatomy." The word "subatom," however, will result in a successful response. In other words, although the desired sequence with a suffix will not provide a successful detection, it is conceivable that the desired sequence with a prefix may provide a successful detection indication. Such an eventuality may be simply provided against by adding another detection stage with associated circuits at the beginning of the sequence detector which shall respond to a space symbol. Since, in the presence of a prefix there is no space symbol, only the sequence "atom" is detected. Thus, the sequence detected is space–*a–t–o–m*–space. Alternative to this, a counter may be provided which has its count initiated each time a space signal is obtained. Thereafter, it counts each signal output from the message-signal source until the total number of units have been counted. In the present example, the count is four. The last count of the counter provides the space signals to the sequence detector necessary to set the success-indicating bistable-state devices. Thus, the message detected would be space–*a–t–o–m*–space (counter).

Figures 7, 7A, 8, 9:
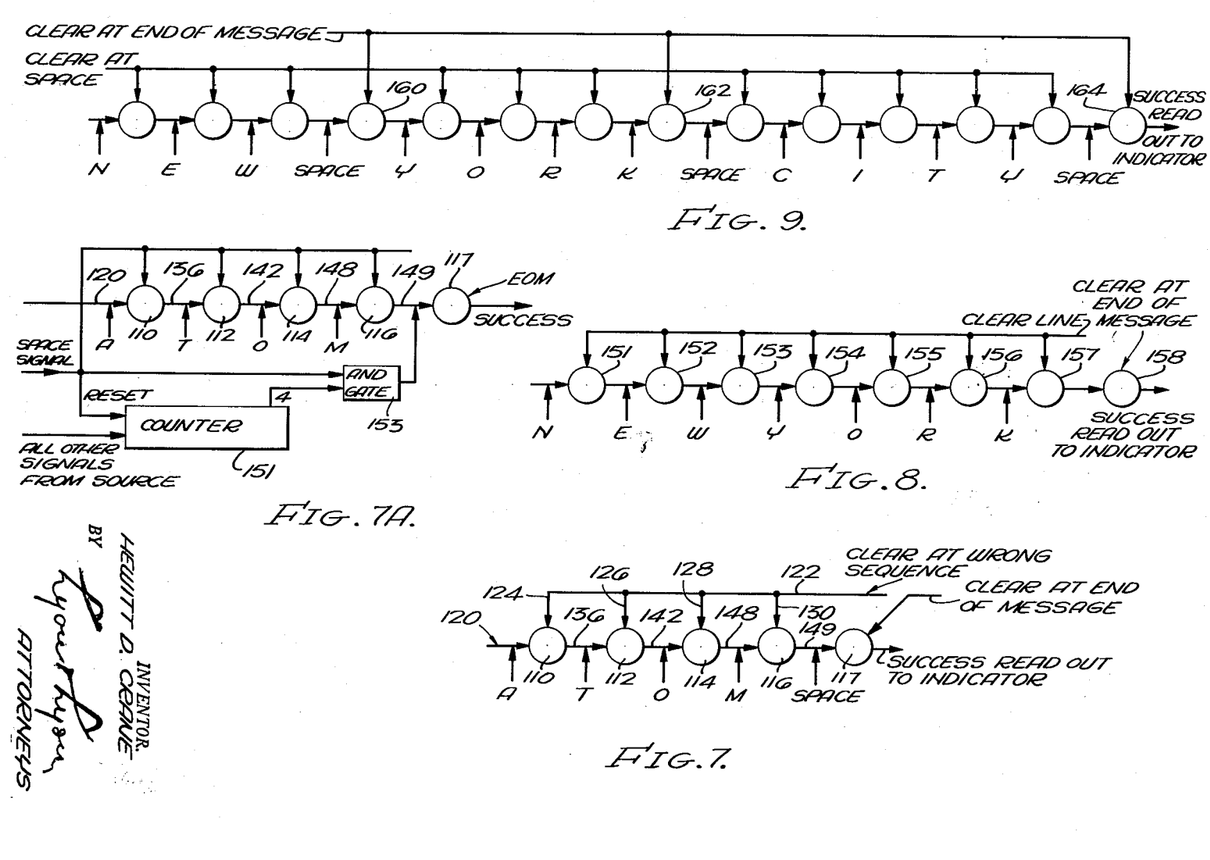
FIGURE 7 is a symbolic representation of the arrangement shown in FIGURE 6, shown to simplify the drawings herein.
FIGURE 7A is a symbolic diagram of another embodiment of the invention.
FIGURE 8 is a symbolic diagram of a phrase sequence detector in accordance with this invention.
FIGURES 9 and 10 are symbolic diagrams of phrase class sequence detectors, in accordance with this invention.

FIGURE 7 shows an arrangement of symbols for representing the cores and associated wiring in FIGURE 6. This is shown for the purpose of simplifying the explanation and drawings which follow. The cores 110, 112, 114, 116, and 117 are represented by the circles. The horizontal arrows between the cores represent the coupling loops 120, 136, 142, 148, and 149. The arrows which terminate at these coupling loops each bears the letter identification corresponding to the similarly identified lines in FIGURE 6. Upon the occurrence of these letters, the once is advanced from one core to the next. The arrows which terminate in each one of the circles in FIGURE 7 and which are designated by the reference numerals 124, 126, 128, and 130 are representative of the clear coils similarly identified in Figure 6. These arrows extend from the clear line 122, which bears adjacent to it the legend "clear at the wrong sequence," indicative of the fact that the core register is cleared in the event a sequence other than *a–t–o–m*–space is obtained. The core 117 may be cleared at the end of the message for which the word is being searched. Of course, if a successful sequence has been detected, the output of the core 117 will indicate that fact.

FIGURE 7A shows how a counter may be employed for eliminating suffixes and prefixes. Instead of exciting the clear line 122 by every signal that occurs, as shown in FIGURE 7, it is excited only each time a space signal occurs. A counter 151 is employed, which is reset each time a space signal occurs. The fourth counter output of the counter together with a space signal are applied to an AND gate 153, the output of which is employed to set the success-indicating core, provided that the preceding "*m*" core has been set. With this arrangement, if desired, inhibit coils may be omitted from all except the last, or "*m*" core. Only the combination of a four count initiated by a space signal which is followed by a space signal can set the success core 117.

Clearing the sequence-detector register at predetermined occurrences, rather than each time the wrong letter in a sequence occurs, has a great number of advantages. For example, if it is desired to look for code words which are made up of every fifth letter in a message, then the clear line 122 may be actuated by any suitable end-of-message signal or after inspecting a predetermined number of words, or by any other criterion within which the desired sequence must exist. Such criterion can be set up, for example, by a counter which counts the units and clears the cores for a fresh search each time the counter fills, without the desired code message having been detected.

FIGURE 8 shows an arrangement which may be employed for looking for phrases. The phrase selected as exemplary is "New York." The magnetic cores 151 through 157 will propagate a set condition in the presence of the proper sequence "New York." The clear line may be actuated either whenever a letter not in the sequence appears, or if a search is to be made over a group of sentences, at the termination of this group of sentences. Core 158 is set if a successful sequence has been detected. It can be cleared at the end of the message and by its output indicate whether or not the desired sequence of units was present.

Figure 10:
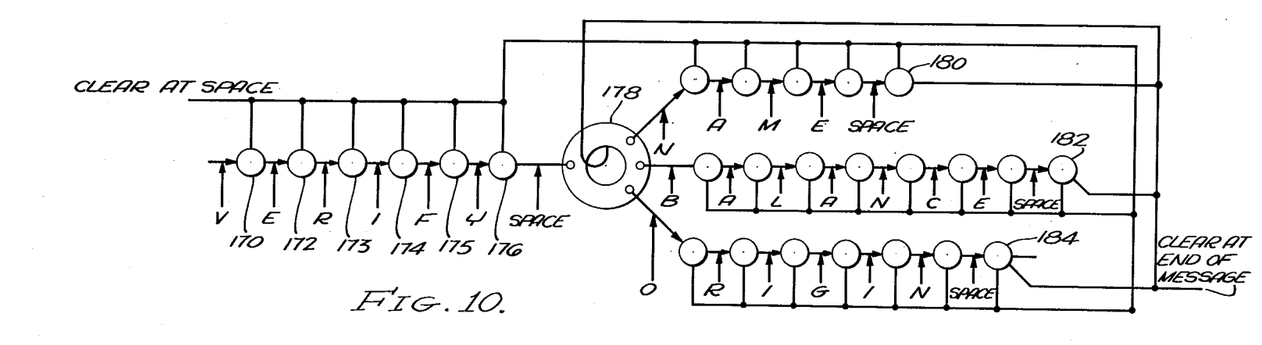

FIGURE 9 shows an arrangement which also may be employed for detecting phrases. The phrase to be detected is "New–York–City." This is to be looked for over an entire message. It will be noted that a success core 160 is interspersed between the register detecting "New" and "York." Another success core 162 is interposed between the register detecting "York" and "City," and a third success core 164 is employed for indicating the success of the phrase detection. The unit cores for detecting "New–York–City" are cleared each time a space occurs between words. The success cores are only cleared at the end of the message. With such an arrangement, once "New" has been found, the core 160 has a one, or set, condition established, whereby the subsequent finding of the letter "y" propagates this set condition into the next sequence detector. Assuming that something other than the desired sequence is found, such as "yrung" or "yorkville," then, at the occurrence of the next space, when the word terminates, the "York" register will be cleared. Since the success core 160 has not yet been cleared, the next time a "y" occurs, the y-core will be driven to its set condition again. At the end of a message, the cores 160, 162, and 164 are all cleared, the remaining cores in the message-sequence detector having been previously cleared by the occurrence of the space symbols between words.

Where the same word may be used in several different phrases, it may be desirable to detect classes of those phrases, such as "verify name," "verify balance," or "verify origin." FIGURE 10 is a symbolic diagram of an embodiment of the invention suitable for searching for a class of phrases. The sequence detector for the word "verify" includes cores 170 through 176. These operate in the previously described manner to advance the set condition of the respective cores in response to the sequence being detected. These cores may be cleared by the occurrence of a space symbol or by the occurrence of a unit other than the one sought for in the sequence. At the completion of a successful sequence, the space line transfers the set condition of the core 176 into a core 178. This core is a multiaperture core, having four small openings in place of the two described heretofore. However, the operation which has been described heretofore for the two-aperture core applies to this four-aperture core. In other words, when the core 178 is set, such set condition enables an output to be derived from each one of the coupling windings connected to the respective small apertures. The principle of operation wherein a current which is less than the amount required to set the succeeding core and yet sufficient to reverse the flux around the aperture in the preceding core to which the winding is coupled, applies in the operation of this core as well. A driving winding and bucking windings must be provided for each aperture, however. Upon the occurrence of the letter "n" or the letter "b" or the letter "o" following the word "verify," any one of the following desired sequences can be searched for.

The fact that an output has been taken from one of the output apertures does not erase or prevent a set output from being obtained from the others of the apertures. Accordingly, the sequence detector can then search for either "name," "balance," or "origin," once the word "verify" has been detected. Cores 180, 182, and 184 respectively indicate the success of the particular phrase-detection operation. These are read and then cleared at the end of the message, and their outputs are applied to the desired success indicators.

Figure 11:
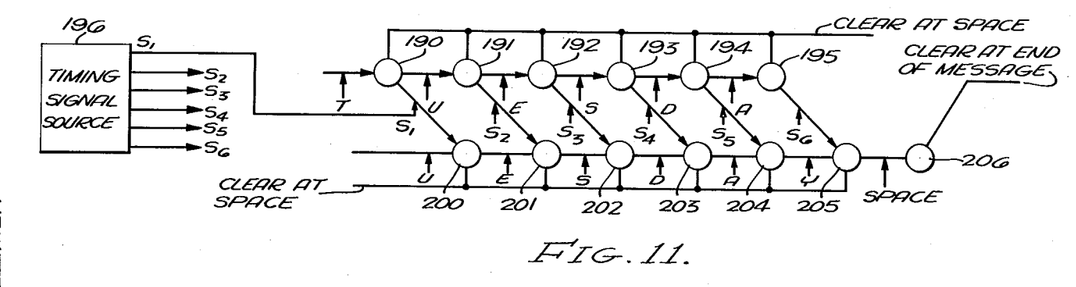
FIGURES 11 and 12 are symbolic diagrams of sequence detectors in accordance with this invention which can operate to neglect errors.

It is possible by the use of simple logic to arrange the sequence detectors in accordance with this invention to neglect certain errors. For example, assume that it is desired to neglect one error which can occur in the word "Tuesday." This one error can occur at any position in the spelling of the word, as indicated by the "x" in the following: Tuesdax, Tuesdxy Tuesxay, Tuexday, Tuxsday, Txesday, Xuesday. FIGURE 11 shows an arrangement in accordance with this invention for neglecting such errors. Each core employed in this sequence detector has three small apertures. The upper row of cores 190 through 195 respectively propagate a one, or set, condition when the letters "Tuesda" are sensed in that sequence. It is required for this embodiment of the invention that after each letter or unit is read, a timing signal be generated. Timing signals are obtained from a timing-signal source 196, which provides as an output the timing signals S1 through S6. The timing-signal source 196 can be, for example, a counter which provides the timing-signal output each time a letter is read. The timing-signal source S1 transfers the set condition of the letter "t" to the first of a second row of cores 200 through 206. This second row of cores will propagate the set condition, or one condition, of the first core in response to letters "esday" being detected. The last core 206 is the success-indicating core, and this is read and cleared at the end of the message. The cores 200 through 205 are cleared at each space between words.

Assume the letters "tue" have been read, whereby core 192 in the upper row has the set condition. Upon the occurrence of the S3 timing signal, this set condition is transferred to core 202. Assume the next letter is an error letter, and thereafter "day" is read. The error will be neglected and the set condition of core 202 will be propagated down through core 205, and then, upon the occurrence of the space, to the core 206, indicative of a success. It can be shown that with the arrangement shown in FIGURE 11 an error in any one of the letter positions of the word "Tuesday" (or any other desired sequence) can be neglected.

Figure 12:
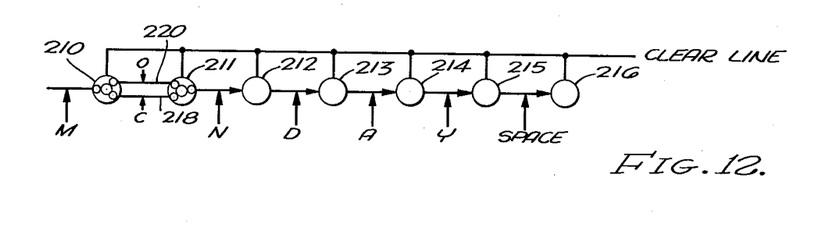

Many other types of error-neglecting circuits are possible. For instance, if it were felt that there was a high likelihood of the letters "o" and "c" being mistaken for each other, and it was desirable to neglect this error, then an extra character winding "o, c" (energized when detecting an "o" or a "c") may be used. This may be seen in referring to FIGURE 12. Here the sequence detector consists of cores 210 through 216, which are employed to indicate a successful reading of the word "Monday." However, there are two coupling windings between the cores 210 and 211. One of these coupling windings 218 is energized when the letter "c" is read; the other of these coupling windings 220 is energized when the letter "o" is read. Alternative to this, the two lines "o" and "c" may be connected to the same apertures. In these ways, logical OR is formed by o+c.

It should be apparent from the above description of the magnetic-core embodiment of the invention how the flip-flop, AND gate, and exclusive-OR gate embodiment of the invention may be made to perform substantially identical logic by the use of a success-storage flip-flop stage between other sequence detectors.

There has accordingly been shown and described hereinabove a novel, useful sequence detector which detects the occurrence of a predetermined sequence of signals. The conversion of signal sequences to the form suitable for utility by this invention provides no problem to a technician skilled in this art. It should also be appreciated that one sequence detector may be employed to look for different sequences by employing switching arrangements which can be operated either manually or automatically, responsive to the success of a previous search. This invention is also usable for finding a plurality of sequences of signals regardless of the concatenation or chain of connections between the respective different sequences.

I claim:

1. A system for detecting the occurrence of a predetermined sequence of signals at a signal source comprising a plurality of bistable-state devices arranged in sequence, a device in the same relative position in its sequence as a signal in said predetermined sequence being associated with that signal, each bistable-state device having a set stable state and a clear stable state, means for driving all said bistable-state devices to their clear states responsive to the occurrences of signals at said source, means responsive to the successive occurrence of signals at said source in said predetermined sequence to successively drive each said associated bistable-state device to its set state and to inhibit the clear state drive applied to said associated bistable-state device and the immediately preceding bistable-state device.

2. A system as recited in claim 1 wherein each said bistable-state device is a core of magnetic material having substantially rectangular hysteresis characteristics, said means for driving all said bistable-state devices to their clear states includes a winding on each core, means for connecting all said windings in series, and means for applying current to said series-connected windings responsive to the occurrence of signals at said source.

3. A system as recited in claim 1 wherein said predetermined signal sequence includes a plurality of separate lesser signal sequences occurring in concatenation.

4. A system for detecting the occurrence of a predetermined sequence of signals at a signal source comprising a plurality of bistable-state devices, arranged in sequence, a device in the same relative position in its sequence as a signal in said predetermined sequence being associated with that signal each bistable-state device having a set stable state and a clear stable state and being drivable from one to the other of said stable states in response to input signals, means for applying signals to said bistable-state devices to drive them to their clear stable states responsive to the occurrence of predetermined signals at said signal source, means for driving a first of said bistable-state devices to its set stable state responsive to the occurrence of the associated first signal at said signal source, coupling means between said bistable-state devices, and means for applying a signal in said predetermined sequence to the coupling means between the bistable-state device associated with said signal and a preceding bistable-state device, said coupling means including means responsive to said signal and to said preceding bistable-state device being in its set stable state to drive said associated bistable-state device to its set stable state.

5. A system as recited in claim 4 wherein said predetermined signal sequence includes a plurality of separate lesser signal sequences occurring in concatenation, each of the bistable-state devices associated with each lesser sequence including a means to drive all but the last of said bistable-state devices to their clear stable states responsive to the occurrence of predetermined signals at said signal source, and means to drive all of said last bistable-state devices to their clear stable states responsive to a signal representing the termination of an interval for detecting the occurrence of said predetermined sequence.

6. A system as recited in claim 4 wherein said means for applying a signal in said predetermined sequence to the coupling means between the bistable-state devices associated with said signal and a preceding bistable-state device includes a counter, means for resetting said counter each time a signal for clearing said cores is applied to drive said bistable-state devices to their clear stable state, means for applying signals from said signal source to said counter to be counted, and means for applying a signal to the coupling means between the last and next-to-last bistable-state device to drive said last bistable-state device to its set condition responsive to the occurrence of a predetermined count of said counter and a signal for clearing said cores.

7. A system for detecting the occurrence of a predetermined sequence of signals in a signal source comprising a plurality of bistable-state devices arranged in sequence, a device in the same relative position in its sequence as one of said signals in said predetermined sequence being associated with that signal, each bistable-state device having a clear and a set stable state and being drivable from one to the other of said stable state in response to input signals, a plurality of lines, means for energizing a different specific one of said lines upon the occurrence at said source of a different specific signal whereby each line is associated with said specific signal, means for driving all said bistable-state devices to their clear stable states responsive to the energization of a line, means for coupling the line associated with a first signal in said signal sequence to the first of said bistable-state devices to drive it to its set state when said line is energized, and coupling means between said bistable-state devices, said coupling means including means responsive to the energization of a line associated with a succeeding signal for inhibiting the drive to the clear stable state of the bistable-state device associated with said line and the immediately preceding bistable-state device, and means for driving a bistable-state device to its set state responsive to the immediately preceding bistable-state device being in its set state and the energization of the line associated with said bistable-state device.

8. A system for detecting the occurrence of a predetermined sequence of signals at a signal source comprising a plurality of bistable-state devices arranged in sequence, a device in the same relative position in its sequence as a signal in said predetermined sequence being associated with that signal, each bistable-state device having a set stable state and a clear stable state and being drivable from one to the other of said stable states in response to input signals, means responsive to the occurrence of a signal at said signal source for applying signals to all said bistable-state devices to drive them to their clear stable states, means for driving a first of said bistable-state devices to its set stable state and for inhibiting the drive to its clear stable state responsive to the occurrence of a first signal in said predetermined signal sequence, and means responsive to the occurrence of a succeeding signal in said sequence for inhibiting the drive to the clear stable state of the associated bistable-state device and the immediately preceding bistable-state device in said sequence and for driving to its set stable state said associated bistable-state device when said immediately preceding bistable-state device is in its set state.

9. A system for detecting the occurrence of a predetermined sequence of signals in a signal source comprising a plurality of bistable-state devices arranged in sequence, a device in the same relative position in its sequence as a signal in said predetermined sequence being associated with that signal, each bistable-state device having a one stable state and a zero stable state and each being drivable from one to the other of said stable states in response to input signals, a plurality of lines each of which is associated with a different signal in said signal source, means for energizing a line upon the occurrence in said source of its associated signal, means responsive to a line being energized for driving all said bistable-state devices to their zero stable states, means for driving a first of said bistable-state devices to its one stable state and for inhibiting the drive to its zero stable state responsive to the energization of a line associated with a first signal in said signal sequence, means responsive to the energization of a line associated with a succeeding signal in said sequence for inhibiting the drive to the zero stable state of a bistable-state device associated with said succeeding signal and an immediately preceding bistable-state device, and means responsive to said preceding bistable-state device being in its one stable state and to the energization of said line associated with said succeeding signal in said sequence for driving said associated bistable-state device to its one stable state.

10. A system for detecting the occurrence of a predetermined sequence of signals in a signal source as recited in claim 9 wherein each said bistable-state device is a flip-flop circuit having a first input terminal to which signals for driving said flip-flop circuit to its set state are applied and a second input terminal to which signals for driving said flip-flop circuit to its clear state are applied; said means responsive to the energization of a line associated with a succeeding signal for inhibiting the drive to the clear stable state of the bistable-state device associated with said line and the immediately preceding bistable-state device comprises a first and second circuit each having two input terminals and an output terminal, and means for providing an output in response to energization of either of its input terminals but not both together, means for coupling the respective first and second circuit output terminals to the respective second terminals of flip-flop circuits associated with the line which is energized and the immediately preceding flip-flop circuit, means coupling one input of said first and second circuits to said energized line, and means for coupling all said lines to said first and second circuit other inputs.

11. A system for detecting the occurrence of a predetermined sequence of signals in a signal source as recited in claim 9 wherein each said bistable-state device is a magnetic core having substantially rectangular hysteresis characteristics; said means for driving a bistable-state device to its set state responsive to an immediately preceding bistable-state device being in its set state and the energization of the line associated with said bistable-state device includes a coupling winding coupling two adjacent cores, and means for coupling said energized line to the portion of said coupling winding between said two cores.

12. A system for detecting the occurrence of a predetermined signal sequence in a signal source comprising a plurality of magnetic cores having substantially rectangular hysteresis characteristics, said plurality of magnetic cores being arranged in sequence, a magnetic core in the same relative position in its sequence as a signal in said predetermined signal sequence being associated with that signal, means for driving said cores to a first state of magnetization representative of a clear state responsive to signals at said signal source including a clear winding wound on each said core, and means for energizing all said clear windings to drive said cores to said clear state, and means for successively driving each core in said sequence to a second state of magnetization representative of a set state responsive to the occurrence of said predetermined signal sequence including a first and second bucking winding wound on each core, means connecting the first bucking winding on a core with the second bucking winding on a succeeding core, a plurality of driving windings each of which couples adjacent cores, means connecting a second bucking winding on a succeeding core to the driving winding coupling said succeeding core to a preceding core, and means responsive to the occurrence of a signal in said sequence for applying a current to the first and second bucking windings and driving winding wherein said second bucking winding and driving winding are coupled to the core associated with said signal, the amplitude of said current being sufficient to enable said first and second bucking windings to buck out the effects of energization of the clear windings and to drive said associated core to the set state provided that the immediately preceding core is in its set state.

13. A system as recited in claim 12 wherein each said core has a substantially toroidal shape with two holes in the toroidal ring, said each first and second bucking windings and each said clear windings are wound through the central toroidal opening of each core, and each of said driving windings coupling two adjacent cores is wound through one of the two holes in the toroidal ring of each of said two adjacent cores.

14. A system as recited in claim 12 wherein a core is associated with two different signals in a predetermined sequence and includes a separate driver winding and first and second bucking windings for each of said two signals.

15. A system as recited in claim 12 wherein said predetermined signal sequence includes a plurality of separate lesser signal sequences occurring in concatenation, means in each lesser signal sequence connecting in series the clear windings of all but the last core associated with said signal sequence, and means connecting in series the clear windings of all said last cores of said lesser signal sequences.

16. A system as recited in claim 12 wherein there are two magnetic cores in said plurality associated with all but the first and last signals in said predetermined signal sequence, said cores being positioned in order to form two said sequences, a separate driver winding coupling a core in one sequence associated with a signal to a core in the other sequence associated with an immediately succeeding signal in said sequence, and means to successively apply an excitation to said separate driver windings between occurrences of signals at said source to drive a core in said other sequence to its set state when the core to which it is coupled in said one sequence is in its set state.

17. A system for detecting the occurrence of a plurality of separate predetermined sequences of signals in a predetermined order comprising for each separate sequence of signals a plurality of magnetic cores having substantially rectangular hysteresis characteristics, said plurality of magnetic cores being arranged in sequence, a core in the same relative position in its sequence as a signal in said predetermined sequence being associated with that signal, means for driving said cores to a first state of magnetization representative of a clear state responsive to signals at said signal source including a clear winding wound on each said core, means connecting all said clear windings in series but the one coupled to the last core in said sequence, means for applying a current to said series-connected clear windings to drive said cores to the clear state responsive to any signal from said source, means for successively driving each core in said sequence to a second state of magnetization representative of a set state responsive to the occurrence of said predetermined signal sequence including a first and second bucking d windings wound on each core, means connecting the first bucking winding on a core with the second bucking winding on a succeeding core, a plurality of driving windings each of which couples adjacent cores, means connecting a second bucking winding on a succeeding core to the driving winding coupling said succeeding core to a preceding core, means responsive to the occurrence of a signal in said sequence for applying a current to the first and second bucking windings and driving winding wherein said second bucking winding and driving winding are coupled to the core associated with said signals, the amplitude of said current being sufficient to enable said first and second bucking windings to buck out the effects of energization of the clear windings and to drive said associated core to the set state provided that the immediately preceding core is in its set state, a separate driving winding for coupling the last core in a plurality of cores associated with one predetermined sequence of signals to the first core in a following predetermined sequence of signals, a separate first and second bucking winding respectively coupled to said last core and first core, means connecting said first and second bucking windings in series, means connecting said second bucking winding to the driving winding between said last and first cores, and means for exciting all said last core clear windings responsive to a signal at said source indicative of the termination of the detection operation.

18. A system for detecting the occurrence of a predetermined signal sequence in a signal source comprising a plurality of magnetic cores having substantially rectangular hysteresis characteristics, said plurality of magnetic cores being arranged in sequence, a core in the same relative position in its sequence as a signal in said predetermined sequence being associated with that signal, means for driving said cores to a first state of magnetization representative of a clear state responsive to signals at said signal source including a clear winding wound on each said core, and means for energizing all said clear windings to drive said cores to said clear state, and means for successively driving each core in said sequence to a second state of magnetization representative of a set state responsive to the occurrence of said predetermined signal sequence including a plurality of driving windings each of which couples adjacent cores, means responsive to the occurrence of a signal in said signal source for applying a current to the driving winding coupled to a core associated with said signal and a preceding core, a counter, means for resetting said counter each time a signal for clearing said cores is applied to drive said cores to their clear state, means for applying signals from said signal source to said counter to be counted, and means for applying a signal to the driving winding coupling the last and next-to-last cores to drive said last core to its set condition responsive to the occurrence of a predetermined count of said counter and a signal for clearing said cores.

19. A system for detecting the occurrence of a predetermined sequence of signals at a signal source comprising a plurality of bistable state magnetic cores which are arrayed in a sequence, one of said magnetic cores being in the same relative position in its sequence as a signal in said predetermined signal sequence being associated with that signal, each said magnetic core having a set state of stable magnetic remanence and a clear state of stable magnetic remanence and being drivable from one to the other of said stable states in response to input signals, means responsive to the occurrence of a signal at said signal source for applying signals to all said magnetic cores to drive them to their clear stable states, means for driving a first of said magnetic cores to its set stable state and for inhibiting the drive to its clear stable state responsive to the occurrence of a first signal in said predetermined signal sequence, and means responsive to the occurrence of a succeeding signal in said sequence for inhibiting the drive to the clear stable state of the associated magnetic core and the immediately preceding magnetic core in said sequence and for driving to its set stable state said associated magnetic core when said immediately preceding magnetic core is in its set state.

References Cited in the file of this patent

UNITED STATES PATENTS

| | | |
|---|---|---|
| 2,776,380 | Andrews | Jan. 1, 1957 |
| 2,803,812 | Rajchman | Aug. 20, 1957 |
| 2,851,675 | Paivinen | Sept. 9, 1958 |
| 2,858,429 | Heywood | Oct. 28, 1958 |
| 2,881,412 | Loev | Apr. 7, 1959 |